United States Patent [19]
Collombin

[11] Patent Number: 5,980,229
[45] Date of Patent: Nov. 9, 1999

[54] HEATING DEVICE FOR MACHINES FOR THE TRANSFORMATION OF PLASTIC MATERIALS

[75] Inventor: André-Marcel Collombin, Versoix, Switzerland

[73] Assignee: Tetra Laval Holdings & Finance SA, Pully, Switzerland

[21] Appl. No.: 09/051,677

[22] PCT Filed: Sep. 23, 1996

[86] PCT No.: PCT/IB96/00979

§ 371 Date: Apr. 14, 1998

§ 102(e) Date: Apr. 14, 1998

[87] PCT Pub. No.: WO97/20678

PCT Pub. Date: Jun. 12, 1997

[30] Foreign Application Priority Data

Dec. 7, 1995 [CH] Switzerland .............................. 3461/95

[51] Int. Cl.⁶ ............................ B29C 31/08; B29C 49/68
[52] U.S. Cl. ...................... 425/174.4; 264/454; 264/535; 425/526; 425/534
[58] Field of Search ................................. 425/174.4, 526, 425/529, 534; 264/454, 535, 458, 459

[56] References Cited

U.S. PATENT DOCUMENTS

| | | | |
|---|---|---|---|
| 3,149,373 | 9/1964 | Marzillier | 425/526 |
| 3,339,373 | 9/1967 | Farrell | 425/526 |
| 3,449,792 | 6/1969 | Plummer | 425/526 |
| 3,852,398 | 12/1974 | Moore | 425/534 |
| 4,050,887 | 9/1977 | Berggren et al. | 425/526 |
| 4,354,813 | 10/1982 | Collombin | 425/526 |
| 4,690,633 | 9/1987 | Schad et al. | 425/526 |
| 4,963,086 | 10/1990 | Wiatt et al. | 425/526 |
| 5,200,134 | 4/1993 | Collombin et al. | 425/529 |
| 5,607,706 | 3/1997 | Ingram | 425/526 |
| 5,876,768 | 3/1999 | Collombin | 425/174.4 |

FOREIGN PATENT DOCUMENTS

| | | |
|---|---|---|
| 24 27 611 | 12/1975 | Germany . |
| 683 757 | 5/1994 | Switzerland . |
| 2 156 732 | 10/1985 | United Kingdom . |

*Primary Examiner*—Robert Davis
*Attorney, Agent, or Firm*—Young & Thompson

[57] ABSTRACT

The heating device for a machine for transforming plastic materials, comprises a heating body (39) disposed between two parallel rows (41, 42) of preforms (14). It is provided with at least two heating tubes (40) having bidirectional heating blades (54). These latter are inclined at an angle (α) such that a first of their faces emits heating radiation (55) in the direction of the adjacent row of preforms and such that the second surface emits its heating radiation (56) substantially in the direction of the free space between the two opposite rows of heating tubes toward the farthest row of preforms. Reflectors (60) are moreover arranged so as to reflect the heating radiation in a horizontal plane toward the preforms (14). The device thus permits obtaining very high energy efficiency whilst avoiding a harmful elevation of the temperature of the machine into which it is integrated.

12 Claims, 5 Drawing Sheets

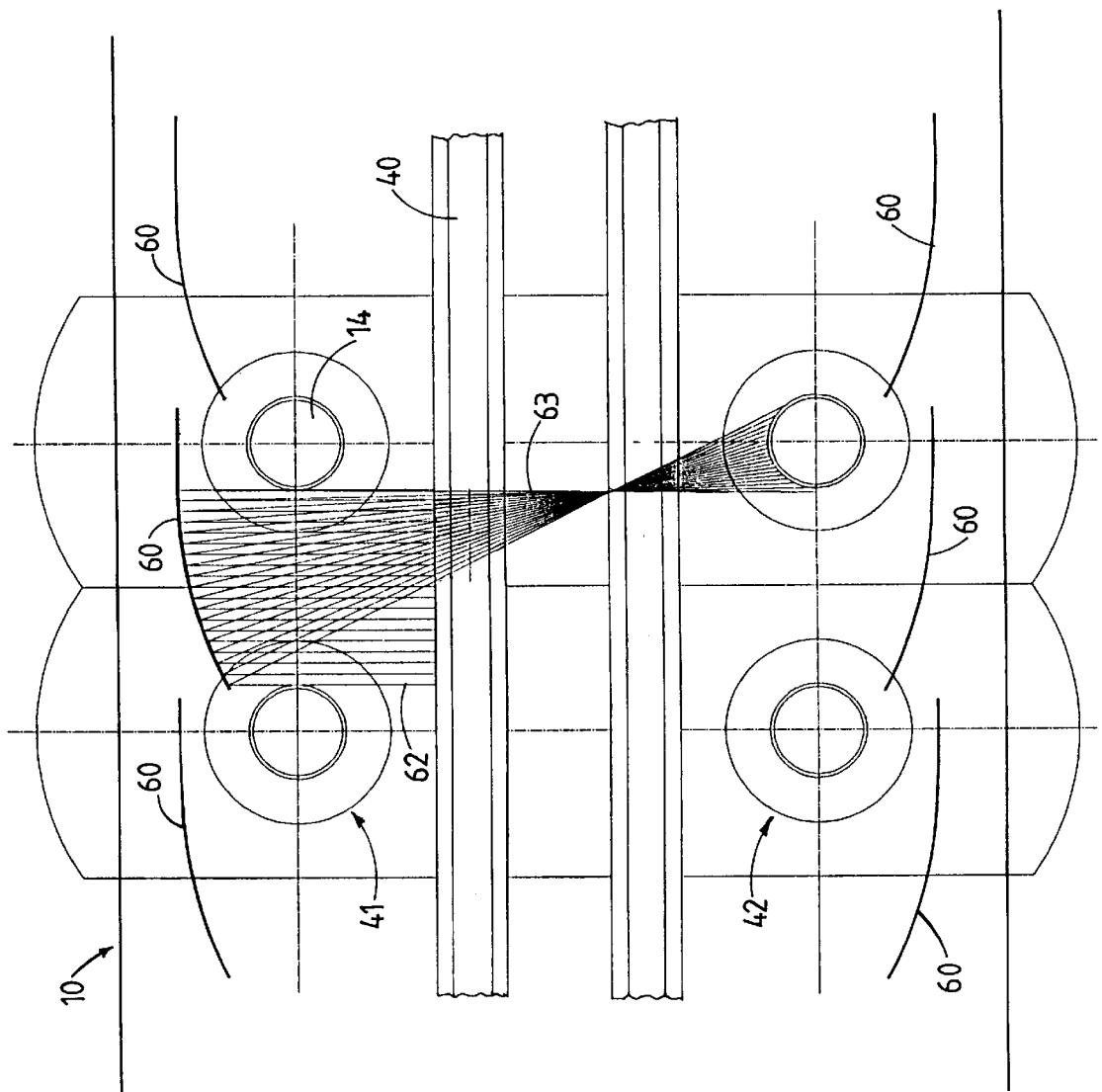

HEATING DEVICE FOR MACHINES FOR THE TRANSFORMATION OF PLASTIC MATERIALS

The present invention relates to a heating device for a machine for the transformation of plastic material, comprising, arranged along a guide track, a heating device adapted to coact with at least one row of preforms carried by supports moved through the heating device, this latter having a heating body arranged facing the preforms.

There is known from Swiss patent 683.757, a machine for the transformation of plastic materials, in the form of a machine for the production of receptacles from PET, comprising a heating device. In this device, the preforms aligned in a single row are displaced in the heating device which comprises infrared lamps disposed on two sides along the row of preforms.

To heat a single row of preforms, the heating device therefore has two heating bodies with infrared lamps. A large portion of the energy of these latter is not specifically directed toward the preforms to be heated, but dispersed laterally and upwardly and downwardly into the general area of the heating device and of the machine. The known heating device is thus less economical and produces a rise in the environmental temperature which is undesirable, or even harmful.

The present invention has for its object to overcome these drawbacks and it is characterized to this end by the fact that the heating body comprises at least two heating tubes each containing a bidirectional heating blade adapted to emit heating radiation to two opposite sides, the two tubes being adapted to be arranged between the two parallel rows of preforms to form a heating body of which each of the heating blades is inclined at a predetermined angle relative to a vertical plane such that a first of its surfaces emits heating radiation in the direction of the adjacent row of preforms and such that the second surface emits heating radiation toward the farther row of preforms substantially in the direction of the space which is not covered by the opposite heating tube or tubes.

There is thus obtained a heating device with a very high energy efficiency. The radiation emitted by the heating tubes is directed precisely toward the preforms to be heated and a single heating body suffices to heat simultaneously two rows of preforms. Regions shaded from the heating radiation of the preforms are avoided. The heating power can thus be greatly decreased, from which result substantial savings of energy. The general environment of the machine may thus remain at a lower temperature.

Preferably, the device comprises at least four heating tubes to comprise a heating body of polygonal cross section, each of the heating blades being inclined at a predetermined angle α relative to a vertical plane such that said second surface emits heating radiation in the direction of the free space between the opposed heating tubes toward the farther preforms.

The geometric arrangement of the heating radiation in thus particularly well distributed and balanced without giving rise to shaded zones and by avoiding in an optimal manner energy losses.

According to a preferred embodiment, the heating body has a substantially rectangular cross section and a horizontal and vertical position of the heating tubes relative to the frame of the heating body and said predetermined angle are adjustable as a function of the size of the preforms.

These characteristics ensure very effective heating at a high output. It is also possible to heat differentially certain regions as a function of the ultimate transformation desired.

Very favorably, the heating device comprises reflectors arranged in an external position relative to the heating tubes and to the preforms and shaped so as to reflect the heating radiation emitted by the heating tubes disposed nearest the reflectors in the direction of the preforms of the farthest row of preforms through the free space between two successive preforms of the nearest row.

There is thus obtained also an optimum horizontal thermal distribution concentrating all of the radiation toward the preforms to be heated. The efficiency is thus again significantly improved, giving rise to substantial savings of energy.

Preferably, the reflectors are of cylindrical incurved shape and of a width substantially equal to the distance separating the centers of two successive preforms.

This arrangement permits a simple construction ensuring high energy efficiency.

According to a preferred embodiment, the heating device comprises a ventilating device comprising means adapted to direct separate airflows toward the heating tubes, through the two rows of preforms and toward their supports.

These characteristics ensure separate effective ventilation and cooling.

The ventilation device thus comprises preferably a horizontal wall adapted to separate a lower aeration channel in which are located the supports of three upper aeration channels comprising a central channel adapted to direct air toward the heating tubes and two lateral channels adapted to direct air toward the preforms.

Each portion of the heating device can thus be cooled or subjected to a change of air in a differentiated manner.

Preferably, said reflectors constitute simultaneously deflectors adapted to direct air from the lateral channels toward the preforms.

There is thus obtained a particularly simple construction, whilst avoiding effectively undesired heating of the reflectors.

Other advantages will appear from the characteristics set forth in the dependent claims and in the description given hereafter of the invention in greater detail with the aid of drawings which show schematically and by way of example one embodiment.

FIG. 5 is a fragmentary horizontal sectional view through the heating device.

Figure 1:
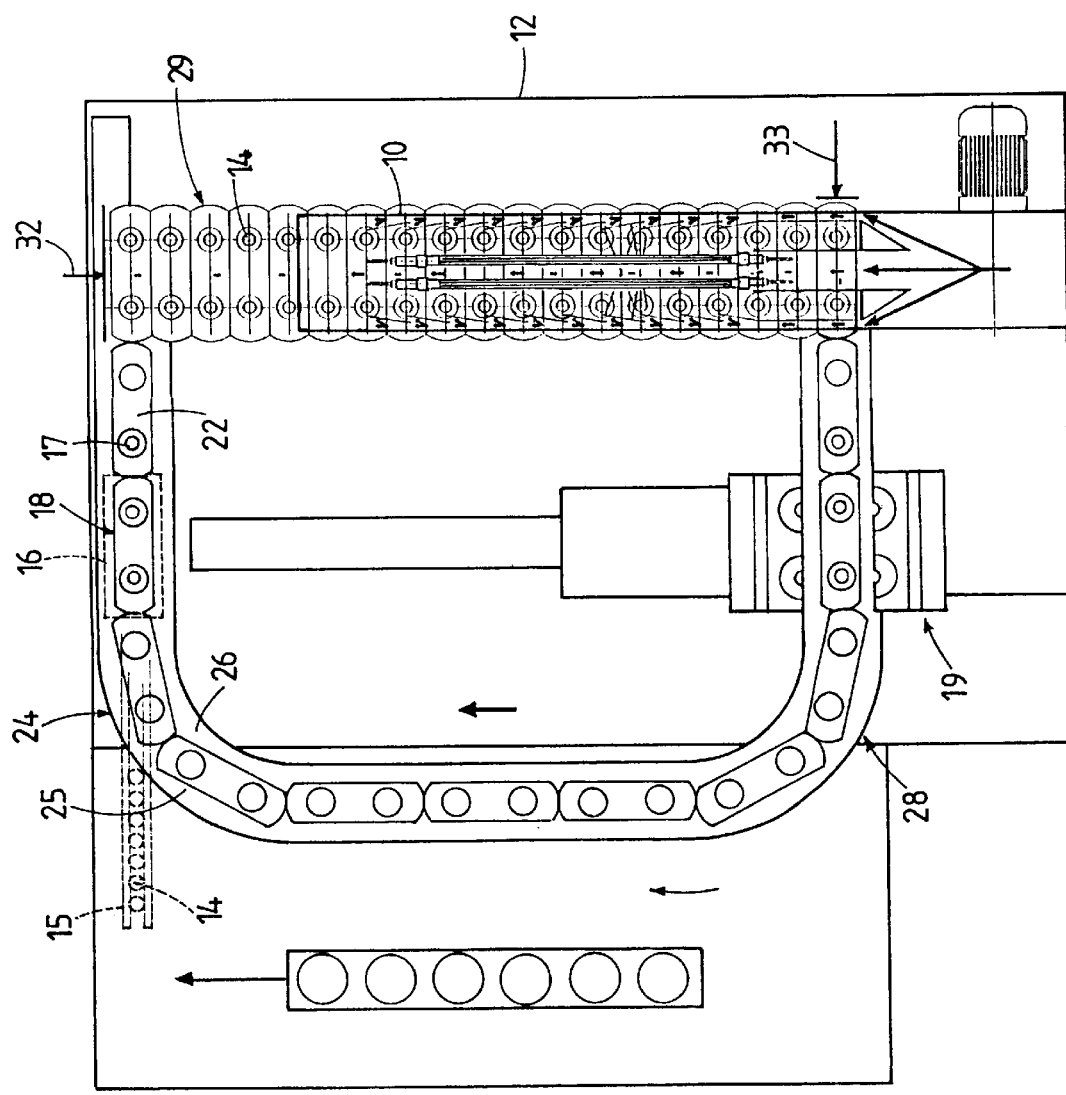
FIG. 1 is a schematic plan view of a machine for the transformation of plastic material in which the heating device according to the invention is integrated.

Referring to FIG. 1, the machine for the transformation of plastic material, such as a machine for the production of receptacles of plastic material by draw-blowing in which the heating device 10 according to the invention is integrated, comprises a frame 12 on which the various devices and members of the machine are mounted in modular fashion. Preforms 14 for the receptacles to be produced are supplied by means of a double rail 15 forming an inclined plane to reach an inverting loading device known per se, shown schematically at 16, in which the preforms are inverted and disposed neck down in supports 17 carried by carriers 18, each carrier carrying two supports 17.

The preforms 14 are then heated in the heating device 10 and moved to a blowing or draw-blowing device 19. After their formation, the receptacles are removed from the supports 17 into an inverting discharge device 20, from which they can be treated according to their future use or moved toward sterilization, filling, labelling, packaging stations, etc.

The empty supports 17 carried by the carriers 18 are then moved to the loading device 16 for the preforms.

The carriers 18 are constituted by plates 22 (FIG. 4) of elongated rectangular shape with rounded ends, comprising two bores 23 in which the supports 17 are maintained. These plates 22 rest laterally on a guide track 24 comprising two lateral rails 25, 26 that touch each other. This guide track comprises two separate portions 28, 29.

A first portion 28 comprises the outlet of the heating device 10, the drawing-blowing device 19, the discharge device 20 and the connection path to the discharge device 16 and the loading device 16 of the preforms 14. In this first portion 28, the plates 22 touch with their rounded ends and are aligned one behind the other thereby forming a single row of supports 17 and preforms 14.

On the other hand, in the second portion 29 of the guide track 20, the plates 18 touch in particular by their long sides and thus form two parallel rows of preforms 14, the two supports 17 of each carrier 18 being aligned in a direction perpendicular to the direction of movement of the carriers.

Of course the number of parallel rows of carriers 18 in the second portion 29 could be greater than one according to the uses and the size of the machine. This second portion 28 will nevertheless comprise at least one row of carriers 18, and hence two parallel rows of preforms 14 and of supports 17 aligned in the direction of movement in the path of the guide track in the heating device 10, as well as at its inlet and at its outlet.

The movement of the carriers 18 in the first and second portions 28, 29 of the guide track is obtained by pushing by means of jacks schematically indicated at 32 and 33. Given that this guide track 24 constitutes a closed circuit, the linear speed of displacement is greater in the first portion 28 than in the second portion 29. This permits gradual and optimum heating of the preforms for a predetermined time. As the heating phase of the preforms requires a greater time than the other phases and operations of production, there is obtained a continuous operation with very high output, whilst reducing the length of the production track and hence the overall size of the machine.

The construction of this heating device 10 is explained in greater detail with reference to FIGS. 2 to 5 and comprises an oven 25 with a movable frame 36 mounted vertically slidably on the frame 12. Thanks to pneumatic jacks 37, this oven 35 can be raised from an active position (FIGS. 3 and 4) to an inactive position during interruption in the production or during stopping or starting of the machine. Thus, the large number of preforms located in the oven is not damaged. Thus, even when the oven is turned off during an interruption, the remaining heat after stopping the oven runs the risk of severely damaging the preforms located in the oven. With a movable oven, this drawback is entirely overcome.

The oven 35 comprises a heating body 39 suspended from a movable frame 36. This heating body comprises at least two bidirectional heating blade tubes 40 of carbon extending longitudinally over the greater portion of the oven. The number of pairs of heating blade tubes depends in particular on the length of the preforms to be heated, in the illustrated example two pairs of tubes are shown. These tubes 40 are arranged so as to emit heating radiation directed to two opposite sides.

The heating body 39 is in active position disposed between two rows 41, 42 of preforms so as to heat simultaneously the preforms 2 of these two rows between which it is disposed. This heating body 39 and the two rows of preforms associated therewith are surrounded by a heating hood 46 fixed to the frame 36. On the hood, the supports 17 for the preforms are protected by a protective profile 48. A fan 71 (FIGS. 2 and 3) disposed at the outlet of the oven 40 ensures change of air in the heating zone.

Figure 4:
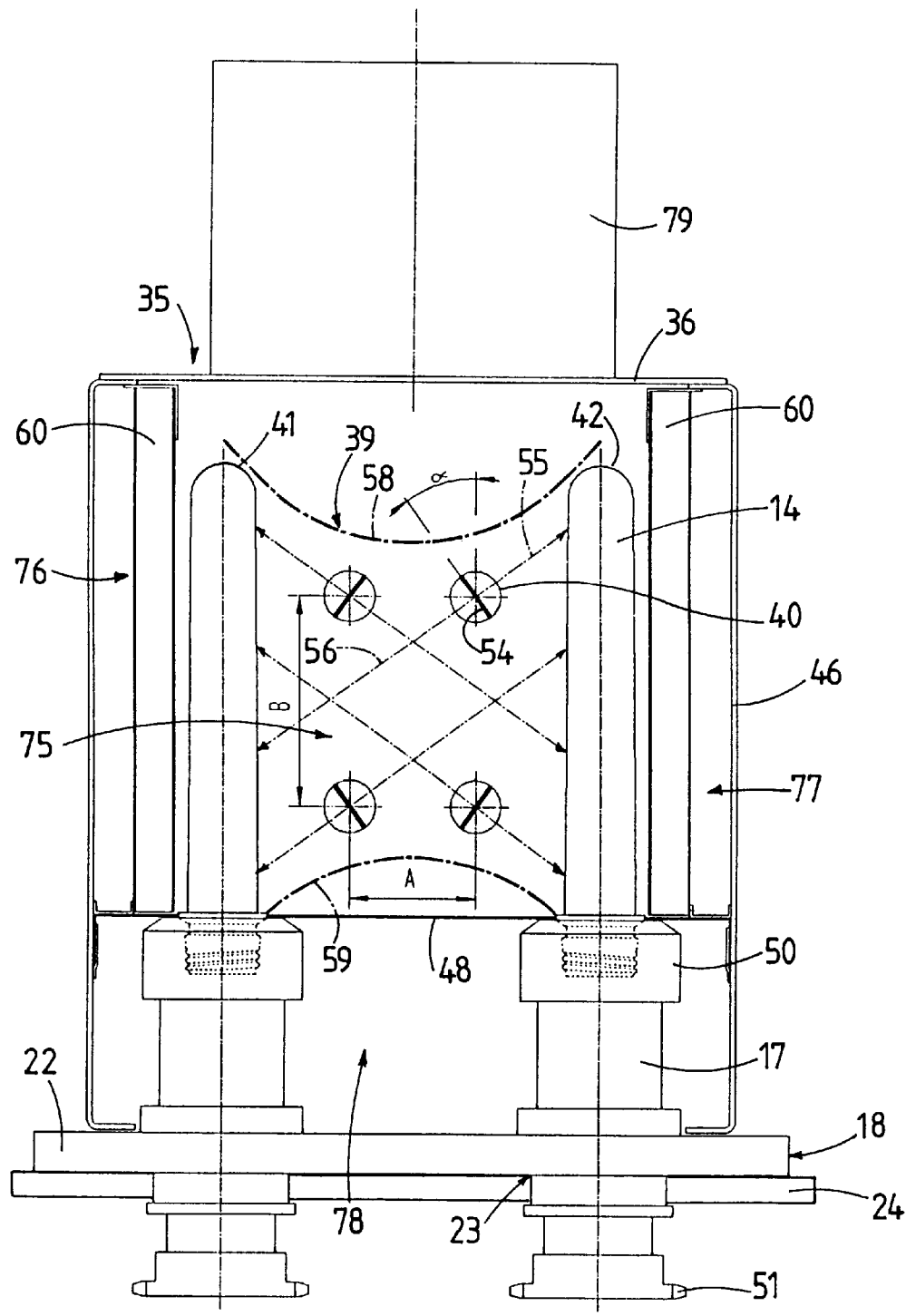
FIG. 4 is a view in transverse cross section through the heating device.

Referring to FIG. 4, the preforms 14 are disposed, neck down, in the upper portion of the support 17 constituted by an annular retention member 50. These supports 17 comprise a tubular portion passing through bearings engaged in bores 23 of the plates 18. These bearings 52 are also retained by means of an annular groove on the rails of the guide track 24 on which the plates 18 rest.

The supports 17, at their lower end, are secured to a drive pinion 51.

The second portion 29 of the guide track 24 is provided with a drive mechanism for rotation of the preforms 14. This mechanism (not shown) comprises a chain or belt arranged parallel to the guide track between two pinions and driven by a motor, to coact with the pinions 51 so as to rotate the supports 17 and the preforms 14 during their passage through the heating device 10.

Referring to FIG. 4, the four tubes 40 with bidirectional heating blades 54 of the heating body 39 are arranged in a generally rectangular arrangement with horizontal spacing A and vertical spacing B that is adjustable. Each heating blade 54 has an adjustable angle $\alpha$ with a vertical plane, such that its forward face emits its heating radiation substantially at an angle of incidence of $90°-\alpha$ toward the adjacent preforms 41, 42 and such that its rear face emits its heating radiation between the opposite tubes toward the preforms of the farther row. The centers of the forward and rear beams of radiant heat emitted by each tube 40 are schematically indicated by arrows 55, 56 in FIG. 4.

The combined forward and rearward heating radiation of the four tubes 40 thus permits obtaining a highly effective heating directed over all the height of the preforms 14, but delimited to this height. Upwardly and downwardly, the heating radiation diminishes very sharply in the central portion as is indicated by the curves 58, 59 of hyperbolic appearance corresponding to the isothermal curves. The energy losses due to radiation directly upwardly and downwardly are therefore greatly reduced. Given that the major portion of the heating radiation emitted by the rear surface of the heating blades 54 is directed between the opposite heating tubes, regions shaded from heating radiation on the preforms 14 are avoided.

By adjustment in horizontal and vertical translation of each of the heating tubes 40 relative to the frame of the heating body 39 and by adjustment to a suitable angle $\alpha$ of inclination, it is possible to optimize the exact geometric distribution of the heating radiation in a plane perpendicular to the heating body 39 and this for all shapes and sizes of preforms 14. Considerable savings of energy can thus be realized by this favorable arrangement of the elements of the heating body.

It is also possible to heat differentially certain regions of the preforms more or less strongly as a function of the ultimate desired transformation of the plastic material.

Figure 2:
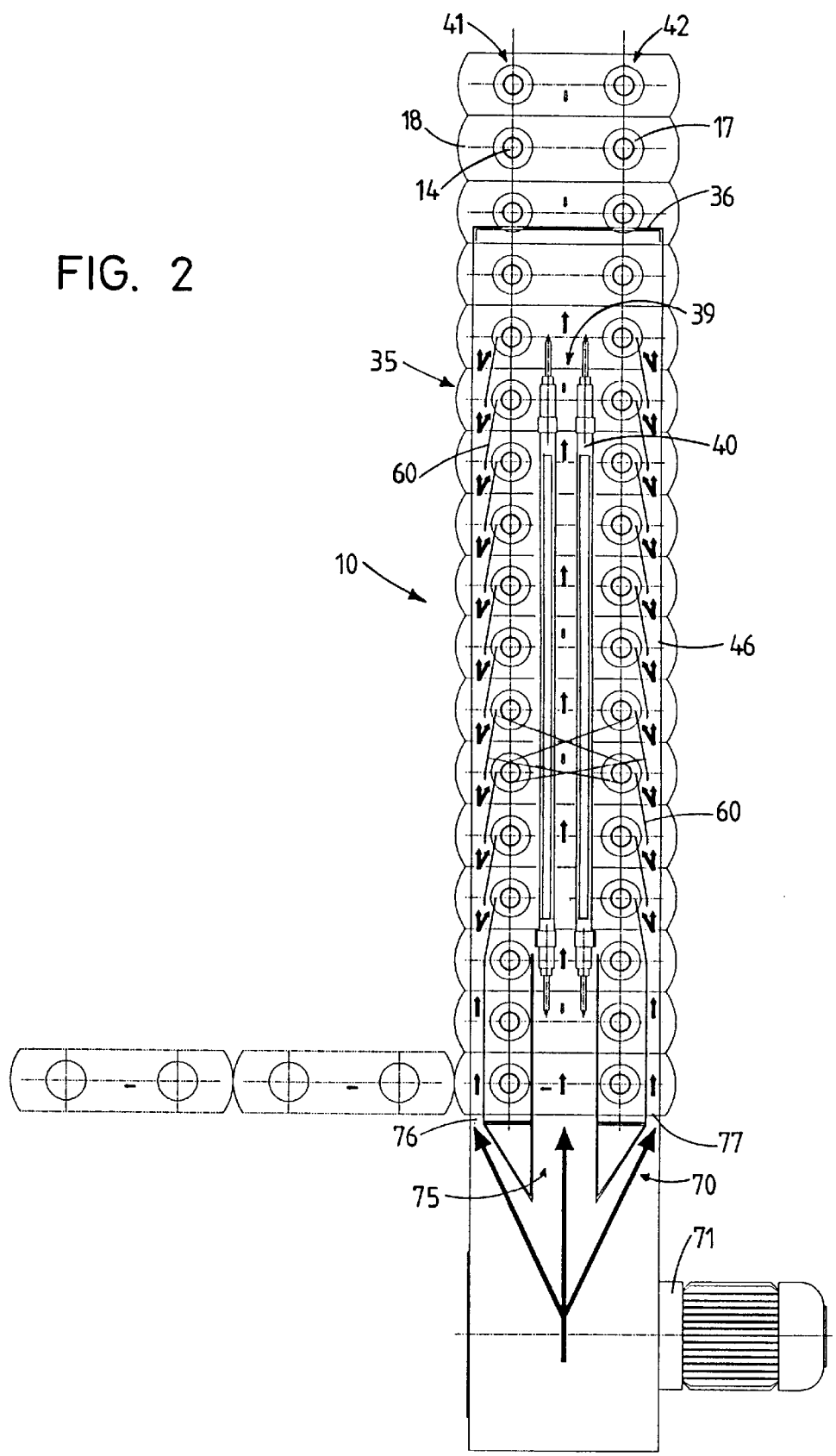
FIG. 2 is a plan view of the heating device.

Referring to FIGS. 2 and 5, the heating device 10 also comprises means adapted to direct suitably the heating radiation so as to obtain an optimum horizontal thermal distribution. These means are constituted by reflectors 60 fixed to the movable frame 36 outside the preforms 14. These reflectors 60 are of cylindrical shape with an incurved section and are shaped so as to reflect radiation 62 emitted between two adjacent preforms of a row 41, such that the reflected radiation 63 will be concentrated on a preform 14 located on the opposite row 42. The reflectors 60 are disposed in a row one following another with a center-to-center distance corresponding to that of two successive preforms 14 of a row. Their width is substantially equal to the distance separating the centers of two successive preforms 14 (FIG. 2).

Thus, in the horizontal plane also, practically no, heating radiation is lost by emission not directed against the preforms, which further permits realizing energy savings.

The assembly of the vertical and horizontal means adapted to direct heating radiation, produces the result that the energy emitted by the heating body is directed in an optimum and adjustable way against the preforms. Heat losses are thus avoided as efficiently as possible. The heating body 39 will therefore operate with greatly reduced power, which permits decreasing substantially the ambient temperature of the machine 12 in which the heating device 10 is integrated.

Of course the heating body 39 could be present in a number greater than four heating tubes 40. Thus, for preforms of very great height, two or even four or more tubes with inclined heating blades 54 could be superposed to form two parallel rows separated by the distance A.

For short preforms, the heating body 39 could also have only two tubes with inclined heating blade such that the second surface emits heating radiation toward the farther row of preforms substantially in the direction of the space not covered by the opposite tube.

Figure 3:
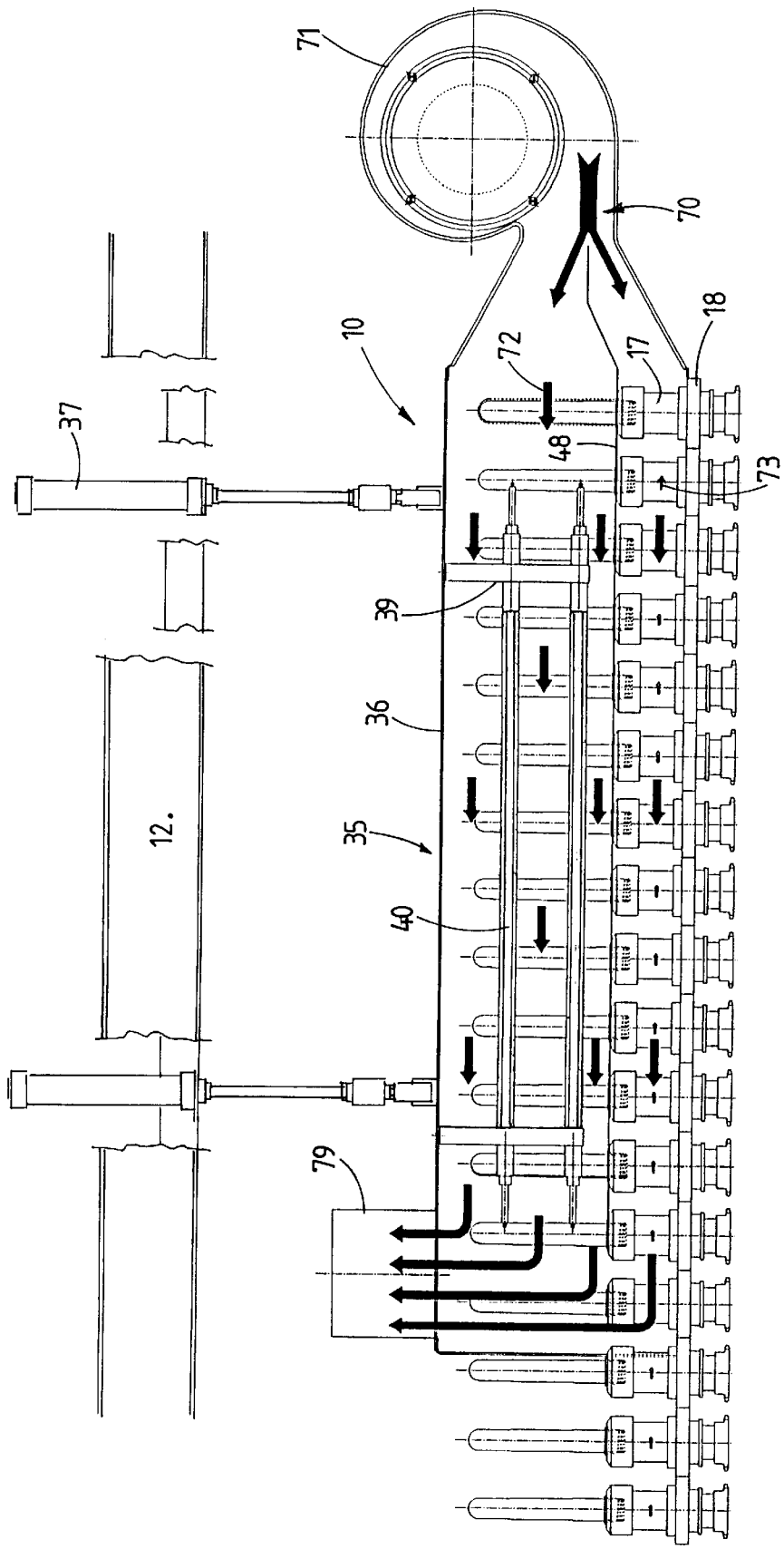
FIG. 3 is a view in longitudinal cross section through the heating device.

Referring to FIGS. 2 and 3, the heating device 10 is provided with a ventilation device 70 comprising a fan 71 disposed at the outlet of the oven 35 and adapted to blow air into the different portions of oven 35 in a direction 72 opposite the direction of advance 73 of the preforms.

This ventilation device comprises four ventilation channels separated in-the horizontal and the vertical plane. The protective profile 48 separates the upper channels 75, 76, 77 from a lower channel 78, in which the supports 17 and the carriers 18 are cooled. Above the profile 48, there is obtained through an upper central channel a replacement of the air surrounding the heating tubes 40, whilst two lateral upper channels 66, 67, separated from the central upper channel 75 by reflectors 60, permit directing the air toward the preforms 14. Because of their incurved shape, the reflectors 60 are simultaneously deflectors adapted to direct the ventilation air in the direction of the preforms 14 and of the supports 17. There is thus obtained an efficient aeration about the preforms 14 whilst cooling the reflectors 60. The ventilation air is evacuated from the oven by an outlet conduit 79.

Of course the embodiment described above is non-limiting and can be the subject of any desirable modification to the interior of the frame as defined by claim 1. Thus, the heating device 10 could be designed for a larger number of pairs of parallel rows of preforms and thus comprises several heating bodies 19 arranged parallel to each other.

The machine 12 for transformation of plastic material could be of any other nature. In particular, the movement of the carriers 18 could be effected by any other actuating means such as pulleys and drive chains, indexed wheels coacting with supports 17 or with carriers 18. The guide track 20 could in particular in its first portion 28, have any other shape, for example a half circle or irregular.

The machine could be connected directly or indirectly to other devices ensuring ultimate treatment of the receptacles. It could also be preceded by an installation for production of these preforms.

The ventilation device could be made in a different way, for example with an air flowing following a different path and comprising a different number of channels.

It could also comprise more than one fan or adjustable valves.

The reflectors 60 could have any other shape, for example inclined flat surfaces.

The machine and its heating device are particularly well adapted for the production of receptacles of polyethylene terephthalate, but could also be adapted to use with other plastic materials.

I claim:

1. Machine (12) fore transforming plastic material, comprising, arranged along a guide track (24), a heating device (10) adapted to coact with at least one row of preforms (14) carried by supports (17) moved through the heating device (10), this latter having a heating body (39) arranged facing the preforms (14), characterized by the fact that the heating body (39) comprises at least two heating tubes (40) each containing a bidirectional heating blade (54) adapted to emit heating radiation to two opposite sides, the preforms being disposed in at least two parallel rows of preforms in the heating device (10), the two tubes being adapted to be arranged between the two parallel rows of preforms to form a heating body of which each of the heating blades (54) is inclined at a predetermined angle ($\alpha$) relative to a vertical plane such that a first of these surfaces emits heating radiation (55) in the direction of the adjacent row of preforms and such that the second surface emits heating radiation (56) toward the farther row of preforms substantially in the direction of the free space between the opposite heating tube or tubes.

2. Heating device according to claim 1, characterized by the fact that it comprises at least four heating tubes (40) to comprise a heating body (39) of polygonal shape, each of the heating blades (54) being inclined at a predetermined angle ($\alpha$) relative to a vertical plane such that said second surface emits heating radiation (56) in the direction of the free space between the opposed heating tubes (40) toward the farther preforms.

3. Device according to claim 2, characterized by the fact that the heating body (39) has a substantially rectangular cross section and by the fact that the horizontal and vertical positions of the heating tubes (40) relative to the frame (36) of the heating body and said predetermined angle ($\alpha$) are adjustable as a function of the size of the preforms (14).

4. Device according to claim 1, characterized by the fact that it comprises reflectors (60) arranged in an external position relative to the heating tubes (40) and to the preforms (14) and so shaped as to reflect the heating radiation emitted by the heating tubes (40) disposed nearest the reflectors (60) in the direction of the preforms (14) of the farthest row of preforms through the free space between two successive preforms of the nearest row.

5. Device according to claim 4, characterized by the fact that the reflectors (60) are of incurved cylindrical shape and of a width substantially equal to the distance separating the centers of two successive preforms.

6. Device according to claim 1, characterized by the fact that it comprises a ventilation device (70) comprising means adapted to direct separate airflows through the heating tubes (40), toward the two rows (41, 42) of preforms (14) and toward their supports (17).

7. Device according to claim 6, characterized by the fact that the ventilation device (70) comprises a horizontal wall (48) adapted to separate a lower air channel (78) in which is located the supports (17) of three upper aeration channels (75, 76, 77), comprising a central channel (75) adapted to direct air toward the heating tubes (40) and two lateral channels (76, 77) adapted to direct air toward the preforms (14).

8. Device according to claim 4, characterized by the fact that said reflectors (60) constitute simultaneously deflectors adapted to direct air from the lateral channels (76, 77), toward the preforms (14).

9. Device according to claim 6, characterized by the fact that said airflows (75, 76, 77) are directed in a direction (72) opposite that (73) of the advance of the preforms (14).

10. Device according to claim 1, characterized by the fact that it comprises carriers (18) each supporting two supports (17) and two preforms (14) arranged side by side perpendicular to the direction of advance of the preforms at the heating device (10), each carrier (18) being in contact with the preceding and following one so as to constitute two parallel rows (41, 42) of preforms (14) between which the heating body (39) is adapted to be positioned.

11. Device according to claim 1, characterized by the fact that the heating body (39) is movably mounted relative to said guide track (24) so as to be able to be displaced from an active position in which it is disposed substantially facing the preforms (14) to an inactive position in which it is spaced from the preforms.

12. Device according to claim 10, characterized by the fact that the heating body (39) is mounted on a movable frame (36), this latter being adapted to be displaced vertically under the action of a lifting device (37).

* * * * *